(12) United States Patent
Fowler et al.

(10) Patent No.: US 11,409,181 B2
(45) Date of Patent: Aug. 9, 2022

(54) ATTENUATOR PHOTONIC CIRCUIT WITH VERTICAL INTERFEROMETRIC STRUCTURE

(71) Applicant: COMMISSARIAT A L'ENERGIE ATOMIQUE ET AUX ENERGIES ALTERNATIVES, Paris (FR)

(72) Inventors: Daivid Fowler, Grenoble (FR); Thomas Mang, Grenoble (FR); Basile Meynard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/109,238

(22) Filed: Dec. 2, 2020

(65) Prior Publication Data

US 2021/0173280 A1 Jun. 10, 2021

(30) Foreign Application Priority Data

Dec. 10, 2019 (FR) ........................................ 19 14061

(51) Int. Cl.
*G02F 1/225* (2006.01)
*G02F 1/01* (2006.01)
*G02F 1/21* (2006.01)

(52) U.S. Cl.
CPC ............ *G02F 1/225* (2013.01); *G02F 1/0147* (2013.01); *G02F 1/212* (2021.01); *G02F 2203/50* (2013.01)

(58) Field of Classification Search
CPC ........ G02F 1/225; G02F 1/0147; G02F 1/212; G02F 2203/50; G02B 6/12002; G02B 2006/12159; G02B 6/1228; G02B 6/2935
See application file for complete search history.

(56) References Cited

U.S. PATENT DOCUMENTS

| 6,768,828 | B2* | 7/2004 | Gill ..................... G02B 6/12007 385/129 |
| 9,690,122 | B2* | 6/2017 | Kamei .................. G02F 1/2257 |
| 2002/0122615 | A1* | 9/2002 | Painter ..................... G02B 6/10 385/15 |

(Continued)

OTHER PUBLICATIONS

French Preliminary Search Report dated Jul. 10, 2020 in French Application 19 14061 filed on Dec. 10, 2019 (with English Translation of Categories of Cited Documents), 2 pages.

(Continued)

*Primary Examiner* — John Bedtelyon
(74) *Attorney, Agent, or Firm* — Oblon, McClelland, Maier & Neustadt, L.L.P.

(57) ABSTRACT

The invention relates to a photonic circuit for attenuating the amplitude of an optical signal, comprising a Mach-Zehnder interferometer for coupling an input waveguide (14) and an output waveguide (15), said interferometer comprising a modulation section (SM1) which includes a first waveguide (11), a second waveguide (12) and a phase shifter (13) configured to introduce a phase difference between a first optical signal circulating on the first waveguide and a second optical signal circulating on the second waveguide.
The first and second waveguides are arranged in two distinct parallel layers and the phase shifter is a thermo-optical phase shifter arranged to preferentially act on one of the first and second waveguides.

13 Claims, 8 Drawing Sheets

(56) References Cited

U.S. PATENT DOCUMENTS

2004/0218868 A1 11/2004 Liu
2014/0147073 A1 5/2014 Huang
2015/0043867 A1 2/2015 Kono et al.

OTHER PUBLICATIONS

U.S. Pat. No. 10,656,332 B2, May 19, 2020, 2019/0170938 A1, Plantier, S, et al.

* cited by examiner

ATTENUATOR PHOTONIC CIRCUIT WITH VERTICAL INTERFEROMETRIC STRUCTURE

TECHNICAL FIELD

The field of invention is that of integrated optics and more particularly that of silicon photonics. The invention more specifically relates to a photonic circuit for variably attenuating the amplitude of an optical signal.

PRIOR ART

Silicon photonics has historically been based on telecommunication applications for which a photonic chip includes between one and about ten optical inputs/outputs, generally interfaces with optical fibres.

More recently, the field of application of silicon photonics has expanded to cover applications relating to the projection of an optical field in free space. These applications, such as 3D imaging or retinal projection, require a network of a large number of emission points, typically between 100 and 10000.

Since each emission point has to be fed by its own waveguide, the guide density is generally much higher than that found in circuits for telecommunication applications. In addition, it is often necessary to individually manipulate intensity and phase of each of these emission points.

However, traditional components for modifying these optical properties often have a large surface area, which is incompatible with a very dense guide network where the pitch of the guides may be only several times the width of the guide itself. This is particularly the case with attenuators which operate with electric control either by modifying the absorption of a waveguide (the imaginary part of its effective index), or by modifying the phase of a waveguide (the real part of its effective index) within an interferometric structure.

The former, known as "electro-absorption" type modulators, can for example be made by taking advantage of the silicon electro-optical effect or the Franz-Keldysh effect in Si/Ge guides. The latter include attenuators/modulators based on interferometric structures, in particular resonant ring type modulators or Mach-Zehnder interferometer type modulators. FIG. 1 illustrates an example of a Mach-Zehnder interferometer integrated within a dense waveguide network. This interferometer couples an input waveguide E and an output waveguide S. It comprises a modulation section which includes a first waveguide B1 (forming the first arm of the interferometer), a second waveguide B2 (forming the second first arm of the interferometer) and a phase shifter D configured to introduce a phase difference between a first optical signal circulating on the first waveguide and a second optical signal circulating on the second waveguide.

As appears from FIG. 1, such attenuators are difficult to integrate into a dense guide network either because of the lateral electrical access of the guides or because the width of the interferometric structure is much greater than that of a single guide.

DISCLOSURE OF THE INVENTION

The invention aims at providing a photonic circuit for variably attenuating the amplitude of an optical signal which has a reduced area footprint and is therefore particularly suited to be more easily integrated into a dense guide network.

For this purpose, the invention provides a photonic circuit for variably attenuating the amplitude of an optical signal, comprising a Mach-Zehnder interferometer for coupling an input waveguide and an output waveguide. The interferometer comprises a modulation section which includes a first waveguide, a second waveguide and a phase shifter configured to introduce a phase difference between a first optical signal circulating on the first waveguide and a second optical signal circulating on the second waveguide. The first and second waveguides are arranged in two distinct parallel layers. The phase shifter is a thermo-optical phase shifter arranged to act preferentially on one of the first and second waveguides by preferentially heating one of the first and second waveguides.

Some preferred but not limiting aspects of this circuit are the following:

said interferometer further comprises:
upstream of the modulation section, a first transfer section capable of separating, by evanescent optical coupling, an input optical signal circulating on the input waveguide between the first optical signal circulating on the first waveguide and the second optical signal circulating on the second waveguide, and downstream of the modulation section, a second transfer section capable of combining, by evanescent optical coupling, the first optical signal circulating on the first waveguide and the second optical signal circulating on the second waveguide into an output optical signal circulating on the output waveguide;

the first transfer section comprises a first transition waveguide arranged in a plane located between the planes in which the first and second waveguides are arranged and shaped so as to recover the input optical signal and transfer half of the input signal to each of the first and second waveguides;

the second transfer section comprises a second transition waveguide arranged in a plane located between the planes in which the first and second waveguides are arranged and shaped so as to combine the first optical signal and the second optical signal to form the output optical signal and to transfer the output optical signal to one of the first and second waveguides;

the first and second waveguides have modal transition portions in each of the first and second transfer sections;

the thermo-optical phase shifter preferentially acts on the first waveguide of the modulation section and the input waveguide is directly coupled to the first waveguide;

the output waveguide is directly coupled to the first waveguide;

the output waveguide is directly coupled to the second waveguide;

the thermo-optical phase shifter preferentially acts on the first waveguide of the modulation section and the input waveguide is directly coupled to the second waveguide;

the output waveguide is directly coupled to the second waveguide;

the output waveguide is directly coupled to the first waveguide;

the thermo-optical phase shifter preferentially acts on the first waveguide of the modulation section and the first waveguide has a width greater than a width of the second waveguide and/or a thickness different from that of the second waveguide and/or is made of a material different from the material of the second waveguide;

it further comprises thermal insulation trenches extending on either side of the interferometer in a light propagation direction.

BRIEF DESCRIPTION OF THE DRAWINGS

Further aspects, purposes, advantages and characteristics of the invention will become clearer upon reading the following detailed description of the preferred embodiments of the invention, given by way a non-limitative example and with reference to the appended drawings in which.

DESCRIPTION OF THE EMBODIMENTS

Figure 1:
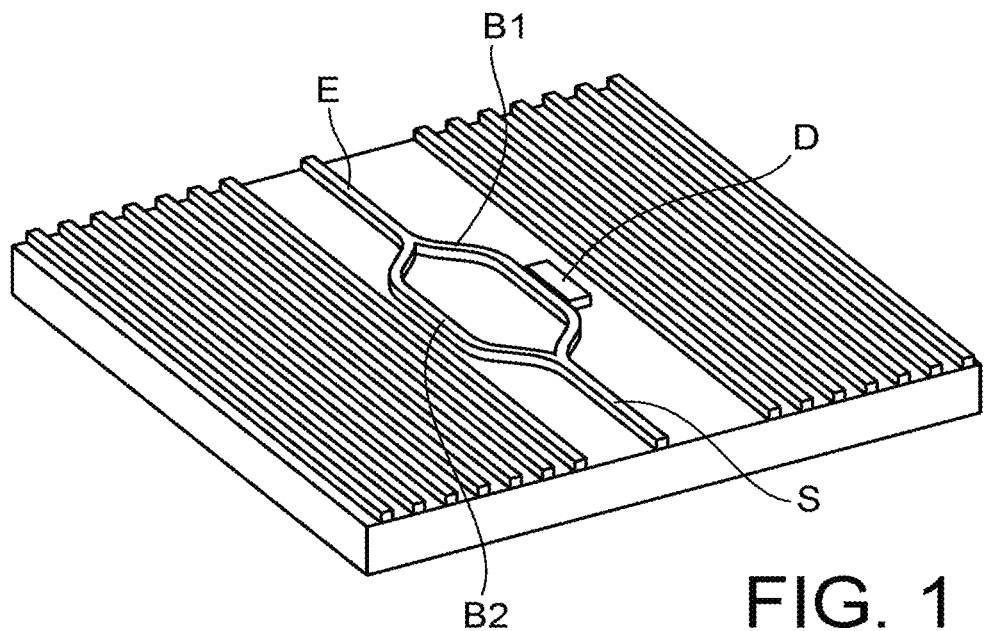
FIG. 1, already discussed above, illustrates a state-of-the-art Mach-Zehnder interferometer attenuator.

The invention is concerned with a photonic circuit for variably attenuating the amplitude of an optical signal which comprises a Mach-Zehnder interferometer for coupling an input waveguide and an output waveguide. The interferometer comprises a modulation section which includes a first waveguide forming a first arm of the interferometer, a second waveguide which forms a second arm of the interferometer, and a phase shifter configured to introduce a phase difference between a first optical signal circulating on the first waveguide and a second optical signal circulating on the second waveguide. Controlling the phase difference enables the attenuation of the intensity of the optical signal circulating on the input waveguide to be controlled.

In order to reduce the width of such an attenuator circuit and make it possible to maintain the waveguide density of an optical component, the invention suggests to replace the traditional horizontal interferometer by a vertical interferometer taking the form of a multilayer structure. Thus, in the circuit according to the invention, the first and second waveguides of the modulation section are arranged in two distinct parallel layers. The first and second waveguides can in particular be superimposed on top of each other. The first and second waveguides may be made of the same material or different materials.

Moreover, in order to control the phase difference and hence attenuation, the phase shifter of the circuit according to the invention is a thermo-optical phase shifter arranged so as to act preferentially on one of the first and second waveguides by preferentially heating one of the first and second waveguides. This phase shifter is, for example, arranged in a third layer parallel and distinct from the layers where the first and second waveguides are arranged.

The first waveguide and the second waveguide are preferentially superimposed on top of each other so that in the modulation section, the first optical signal and the second optical signal propagate parallel. However, the invention is not limited to this preferential embodiment and thus extends to first and second waveguides not having the same length, to first and second waveguides not having the same geometry (they may not have the same width and/or thickness) or even to first and second waveguides not extending along identical optical paths (one may be straight while the other is curved, for example).

The circuit according to the invention further comprises, upstream of the modulation section, a first transfer section capable of separating, by evanescent optical coupling, an input optical signal circulating on the input waveguide between the first optical signal circulating on the first waveguide and the second optical signal circulating on the second waveguide.

And the circuit according to the invention also comprises, downstream of the modulation section, a second transfer section capable of combining, by evanescent optical coupling, the first optical signal circulating on the first waveguide and the second optical signal circulating on the second waveguide into an output optical signal circulating on the output waveguide.

The evanescent coupling thus makes it possible to transfer part of the energy of the input signal to one or more waveguides of the modulation section arranged on (a) lower/upper layer(s). The same evanescent coupling effects are used to move energy up/down from one or more waveguides of the modulation section to the output guide and induce constructive/destructive interference depending on the relative phase shift undergone by the optical field as it passes through that of the first and second waveguides on which the thermo-optical phase shifter preferentially acts.

In a first exemplary embodiment, the first and second waveguides have modal (taper) transition portions in each of the first and second transfer sections. These modal transition portions ensure, in the first transfer section, the transfer of part, typically half, of the energy of the signal circulating on one of the guides to the other guide and, in the second transfer section, the transfer of, typically all, the energy, of the signal circulating on one of the guides to the other guide.

These modal transition portions can be designed in particular by simulating the transfer sections as a whole. More particularly, the output power of a transfer section is simulated as a function of the widths and lengths of the modal transition portions. These simulations can in particular be used to compensate for any optical losses induced by the proximity of the thermo-optical phase shifter to one of the guides of the modulation section, leading for example to a first transfer section with a power division slightly different from 50%.

In a second exemplary embodiment, the first transfer section comprises a first transition waveguide arranged in a plane located between the planes in which the first and second waveguides are arranged, typically the mid-plane between the planes of the first and second waveguides. This first transition waveguide is shaped to recover the optical input signal and transfer half of the input signal to each of the first and second waveguides. The second transfer section in turn comprises a second transition waveguide arranged in a plane between the planes in which the first and second waveguides are arranged, typically the mid-plane between the planes of the first and second waveguides. This second transition waveguide is shaped so as to combine the first optical signal and the second optical signal to form the optical output signal.

FIGS. 2, 3, 10 and 13 schematically represent different possible exemplary embodiments of a circuit 10, 20, 30, 40 according to the invention in which the thermo-optical phase shifter preferentially acts on the first waveguide of the modulation section. Each of these figures is a cross-section view of a circuit according to the invention taken along a light propagation direction called the longitudinal direction.

Circuit 10, 20, 30, 40 comprises as indicated above a modulation section SM1, SM2, SM3, SM4 which includes a first waveguide 11, 21, 31, 41, a second waveguide 12, 22, 32, 42 and a phase shifter 13, 23, 33, 43 configured to introduce a phase difference between a first optical signal circulating on the first waveguide and a second optical signal circulating on the second waveguide. In the examples herein represented, the first waveguide 11, 21, 31, 41 is arranged in an upper layer of the circuit and the second waveguide 12, 22, 32, 42 is arranged in a lower layer of the circuit. The phase shifter 13, 23, 33, 43 is also arranged above the first waveguide, so as to act preferentially on the first waveguide.

The circuit 10, 20, 30, 40 additionally includes the first transfer section SS1, SS2, SS3, SS4 upstream of the modulation section to distinct by evanescent optical coupling an input optical signal circulating on the input waveguide 14, 24, 34, 44 between a first optical signal circulating on the first waveguide 11, 21, 31, 41 and a second optical signal circulating on the second waveguide 12, 22, 32, 42. And the circuit also includes the second transfer section SC1, SC2, SC3, SC4 downstream of the modulation section for combining, by evanescent optical coupling, the first optical signal circulating on the first waveguide 11, 21, 31, 41 and the second optical signal circulating on the second waveguide 12, 22, 32, 42 into an output optical signal circulating on the output waveguide 15, 25, 35, 45.

The different guides of circuit 10, 20, 30, 40 are surrounded by an encapsulation material 17, 27, 37, 47 carried by a substrate 16, 26, 36, 46.

Figure 2:
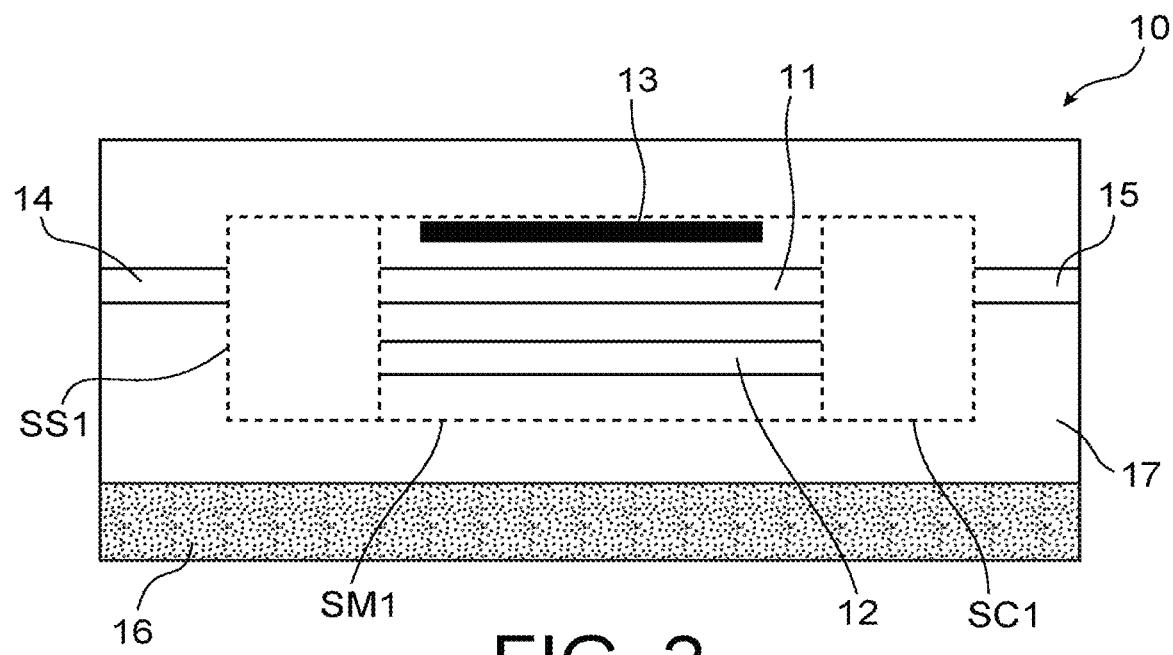
FIG. 2 is a diagram of a longitudinal cross-section of a circuit according to a first possible embodiment of the invention.
Figure 3:
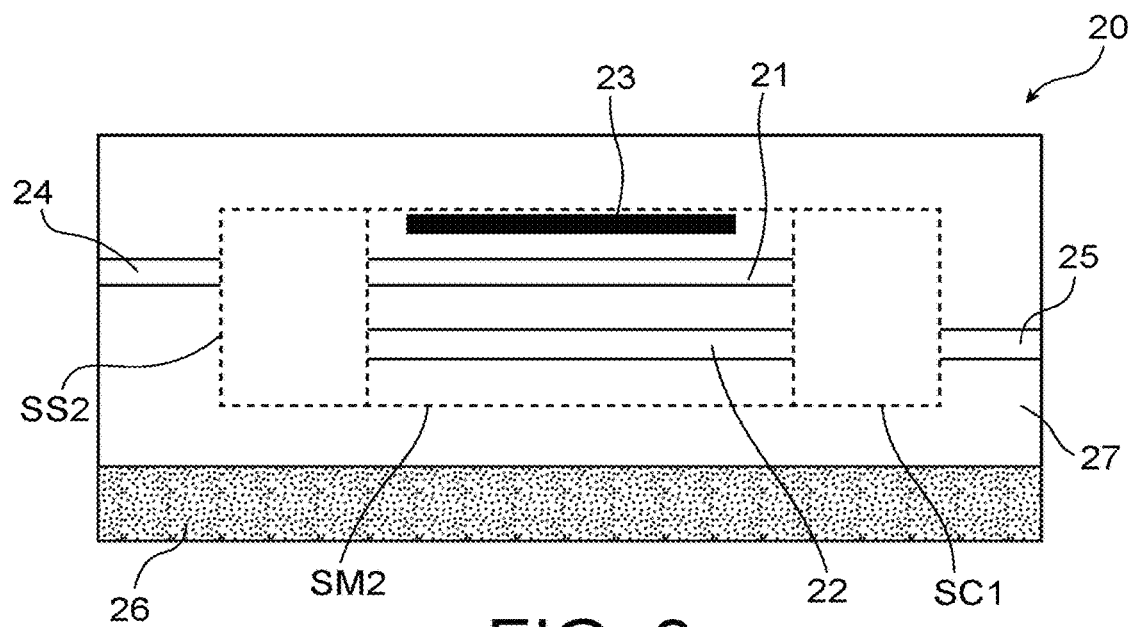
FIG. 3 is a diagram of a longitudinal cross-section of a circuit according to a second possible embodiment of the invention.

In the exemplary embodiments of FIGS. 2 and 3, the input waveguide 14, 24 is arranged at the same level as the first waveguide 11, 21 and directly coupled thereto. The first transfer section SS1, SS2 therein is configured to transfer part of the energy of the input signal circulating on the input waveguide, preferably half of this energy, to the second waveguide 12, 32 arranged in a lower layer.

In FIG. 2, the output waveguide 15 is arranged at the same level as the first waveguide 11 and directly coupled thereto. The second SC1 transfer section is therein configured to bring up energy from the second waveguide 12 arranged in a lower layer, preferably all of the energy of the second optical signal.

In FIG. 3, the output waveguide 15 is arranged at the same level as the second waveguide 22 and directly coupled thereto. The second transfer section SC2 therein is configured to bring down energy from the first waveguide 21 arranged in an upper layer, preferably all of the energy of the first optical signal.

Figure 10:
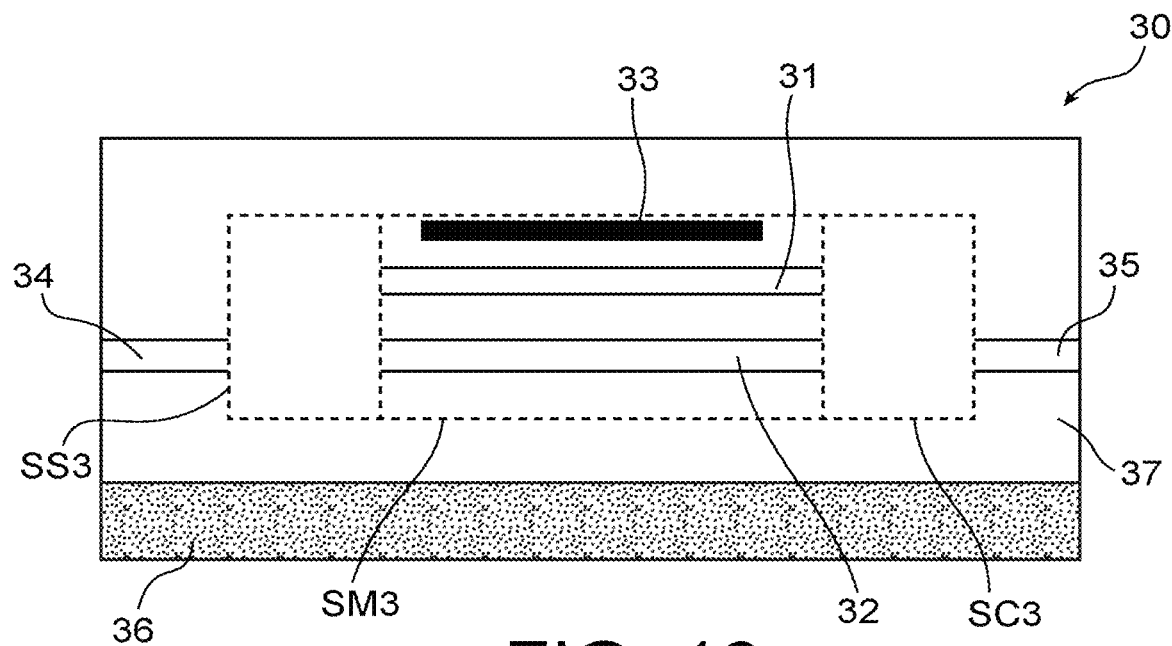
FIG. 10 is a diagram of a longitudinal cross-section of a circuit according to a third possible embodiment of the invention.
Figure 13:
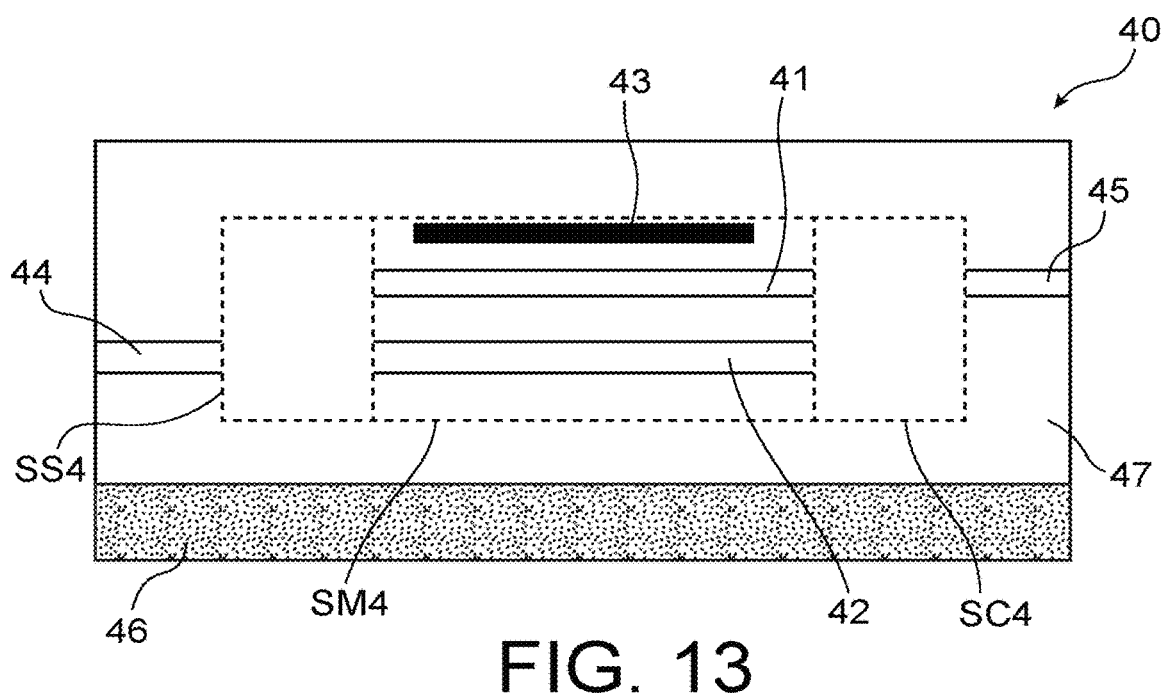
FIG. 13 is a diagram of a longitudinal cross-section of a circuit according to a fourth possible embodiment of the invention.

In the exemplary embodiments in FIGS. 10 and 13, the input waveguide 34, 44 is arranged at the same level as the second waveguide 32, 42 and directly coupled thereto. The first transfer section SS3, SS4 therein is configured to transfer part of the energy of the input waveguide, preferably half of it, to the first waveguide 31, 41 arranged in a lower layer.

In FIG. 10, the output waveguide 35 is arranged at the same level as the second waveguide 31 and directly coupled thereto. The second transfer section SC3 therein is configured to bring down energy from the first waveguide 31 arranged in an upper layer, preferably all of the energy of the first optical signal.

In FIG. 13, the output waveguide 45 is arranged at the same level as the first waveguide 41 and directly coupled thereto. The second transfer section SC4 therein is configured to bring up energy from the second waveguide 42 arranged in a lower layer, preferably all of the energy of the second optical signal.

Figure 4:
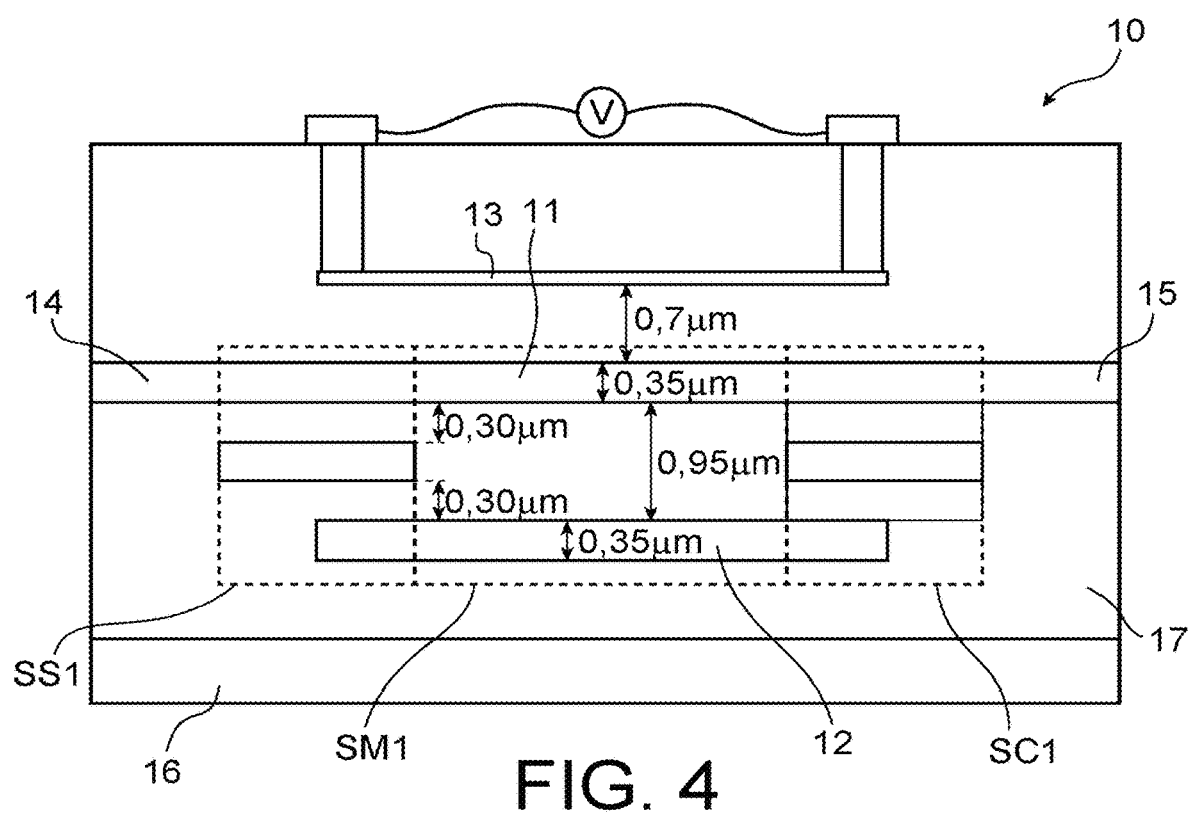
FIG. 4 is a diagram of a longitudinal cross-section of an exemplary embodiment of a circuit according to the first embodiment of the invention.
Figure 5:
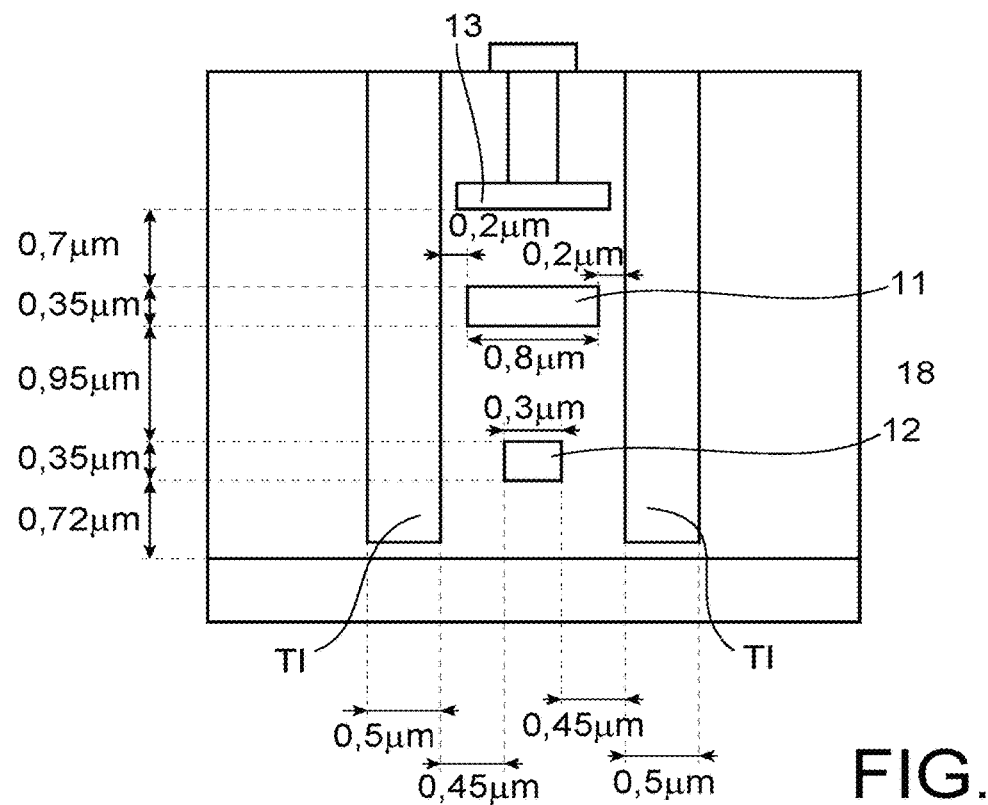
FIG. 5 is a diagram of a transverse cross-section of the circuit of FIG. 4.
Figure 6:
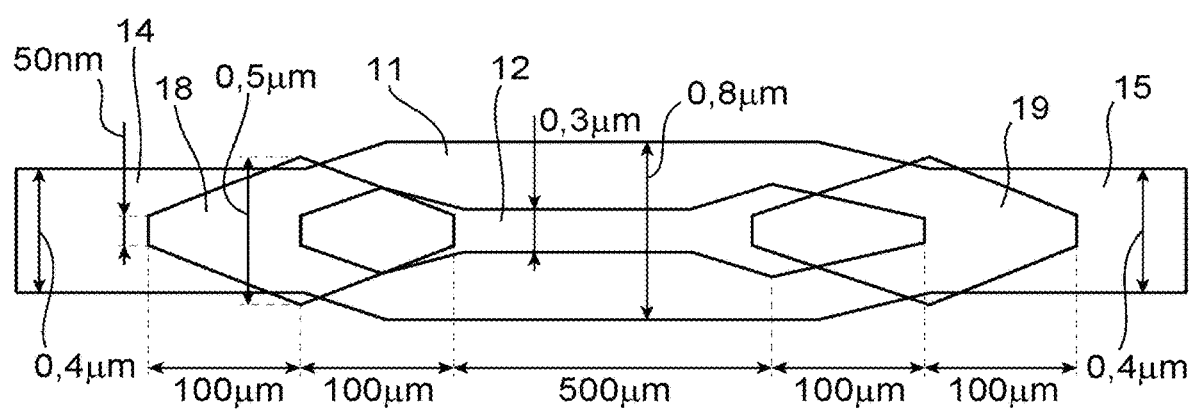
FIG. 6 represents different views of the waveguides of a circuit in accordance with the first possible embodiment of the invention.

FIGS. 4, 5 and 6 represent an exemplary embodiment of a circuit using the first embodiment of the invention (i.e. according to the scheme in FIG. 2) with transfer sections using transition guides. In this example, the interferometer comprises three parallel and distinct optical layers made of SiN (whose effective index is about 2 at a wavelength of 905 nm) and surrounded by SiO2, namely an upper layer, a lower layer and an intermediate layer between the upper and lower layers. The upper layer is for example spaced by 0.3 µm from the intermediate layer, the intermediate layer is for example spaced by 0.3 µm from the lower layer and the lower layer is for example spaced by 0.72 µm from substrate 16.

Light enters through an input guide 14 made from the upper layer, which has in a plane transverse to the light propagation direction, a height of 350 nm and a width of 400 nm. In the first transfer section SS1, a first transition guide 18 is placed in the intermediate layer. The width of this transition guide 18 is gradually increased, e.g. from 50 nm to 500 nm over a distance of 100 µm, in order to ensure transfer of the entire optical field of light from the input guide. A decrease in the width of transition guide 18, for example from 500 nm to 50 nm over a distance of 100 µm, then transfers 50% of the light back to the first guide 11 in the upper layer and 50% to the second guide 12 in the layer.

As a result of the 50/50 separation of the input signal between the first optical signal on the first guide and the second optical signal on the second guide, the first optical signal and the second optical signal propagate in parallel in the modulation section SM1 over 500 µm.

Figure 7:
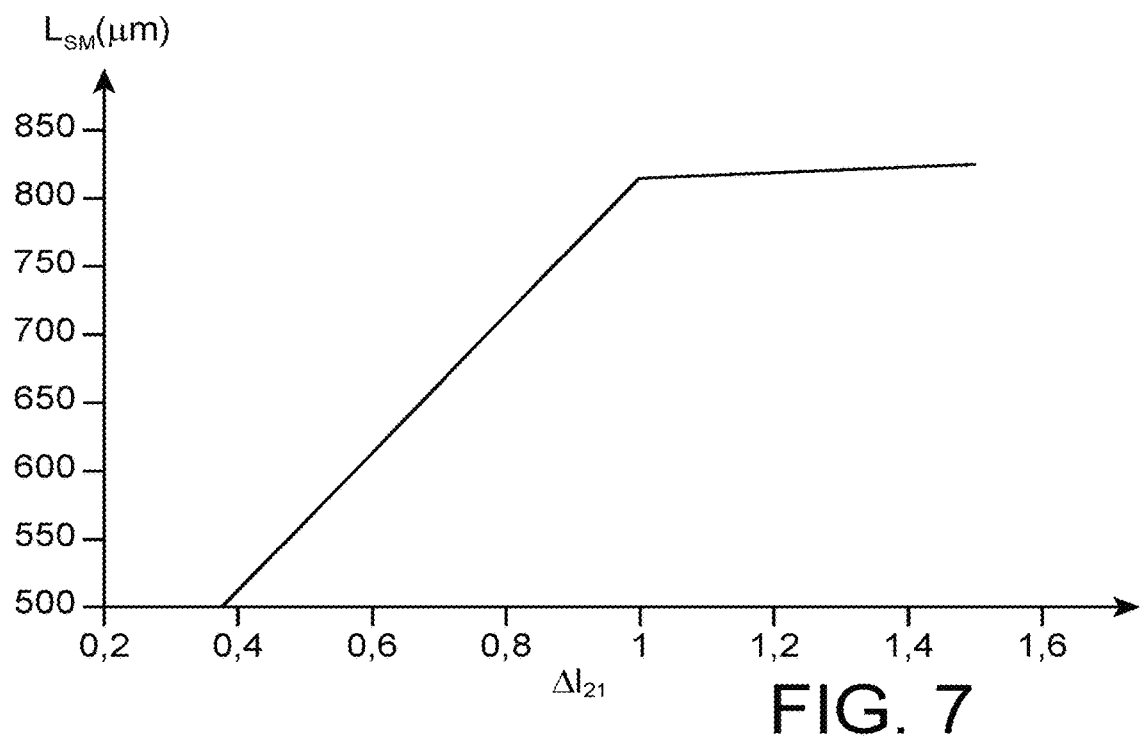
FIG. 7 illustrates the effect of the width of the first and second waveguides on the necessary length of these guides to introduce a phase shift of $\pi$.

As represented in the cross-section view in FIG. 5, in this modulation section the first and second guides 11, 12 may have different widths, for example a width of 800 nm for the first guide 11 and a width of 300 nm for the second guide 12. This results in a difference in optical field confinement within each guide which can be employed to reduce the length required to effect a relative phase shift of π between the arms of the interferometer, for a given heating temperature. In this connection, FIG. 7 shows the results of a simulation of the length $L_{SM}$ of the modulation section required to achieve such a phase shift as a function of the ratio $\Delta I_{21}$ of the width of the second guide to the width of the first guide, for a temperature difference between the two guides of 40° C. With guides of the same width, the modulation section should have a length of 825 μm. By adopting a width of 800 nm for the first guide 11 and a width of 300 nm for the second guide 12, the length of the modulation section can be reduced to 500 μm.

Downstream of the modulation section SM1, in the second transfer section SC1, light from the second guide 12 is then transferred to the output guide arranged in the upper layer via a second transition guide 19 arranged in the intermediate layer. Depending on the phase relationship between light emerging from the first and second guides 11, 12, an interference effect induces an attenuation of output intensity relative to the input intensity of the circuit.

Figure 8:
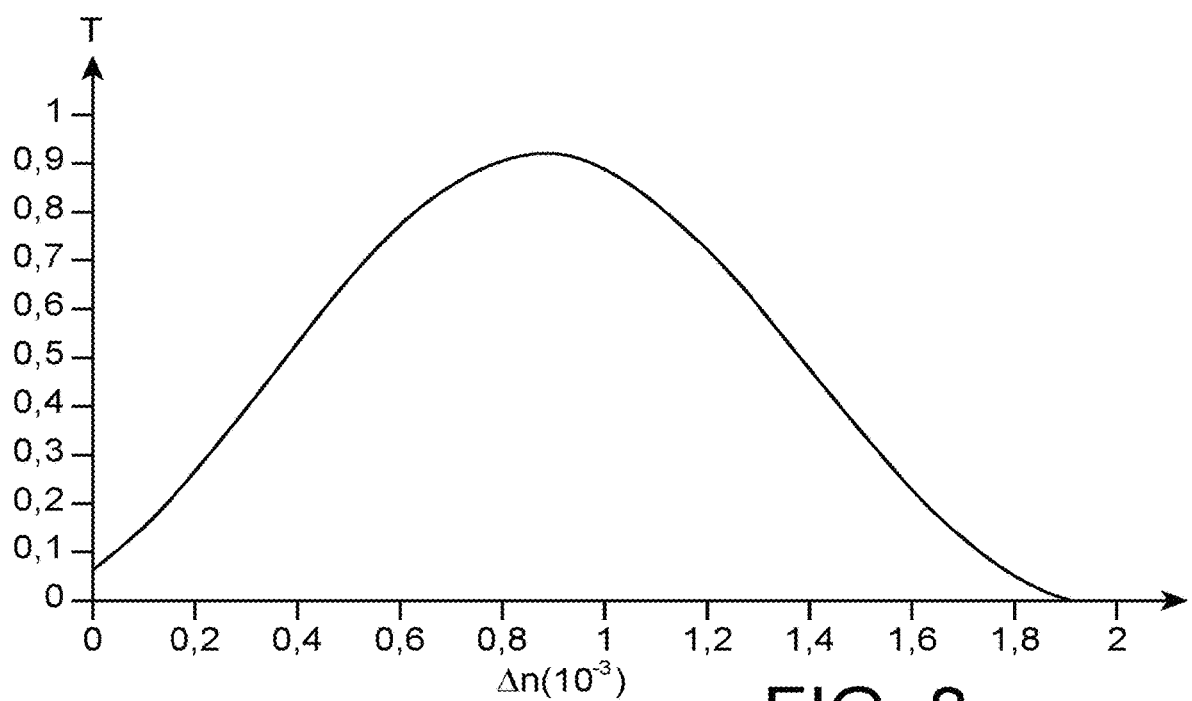
FIG. 8 represents the transmission of the attenuator circuit in FIGS. 4-6 as a function of the index difference between the materials making up the first and second waveguides.

FIG. 8 illustrates a transmission rate T of the light intensity (at λ=905 nm) achieved by the circuit in FIG. 6 as a function of an index difference Δn of the core material of the first and second guides 11, 12. It is noticed that a variation in the index difference of about $9.2 \times 10^{-4}$ is sufficient to vary the transmission from about 10% to a transmission of about 90%. Within the scope of the invention, this relative index difference is actively controlled by adopting a thermo-optical phase shifter arranged to heat one of the first and second waveguides preferentially to the other of the first and second waveguides. In the exemplary embodiment herein described, this phase shifter takes the form of a heater 13 placed above the first waveguide 11, for example by being spaced by 0.7 μm from it. When a voltage V is applied to this heater 13, a thermal gradient is generated and as the first guide 11 is closer to the heater than the second guide 12, the first guide 11 undergoes a higher temperature increase than that undergone by the second guide. In this example, the intermediate layer, among other things, increases the temperature difference between the first and second guides by moving them further away from each other.

Due to the thermo-optical effect, the effective index of the optical mode in the first SiN guide, 800 nm wide, 350 nm thick and surrounded by silica is $2.3 \cdot 10^{-5} K^{-1}$. Indeed, the thermo-optical index of SiN is $3.5 \cdot 10^{-5} K^{-1}$ at 905 nm. However, the effective thermo-optical index of the TEO mode in the SiN guide with a thickness of 350 nm and a width of 800 nm is $2.3 \cdot 10^{-5} K^{-1}$ because only 61% of the TEO mode is confined in SiN surrounded by silica. Therefore, a temperature difference between the first and second guides, that enables an index difference of $9.2 \times 10^{-4}$ to be created and thus a passage between minimum attenuation and maximum attenuation of light intensity to be generated, is 40 degrees.

Figure 9:
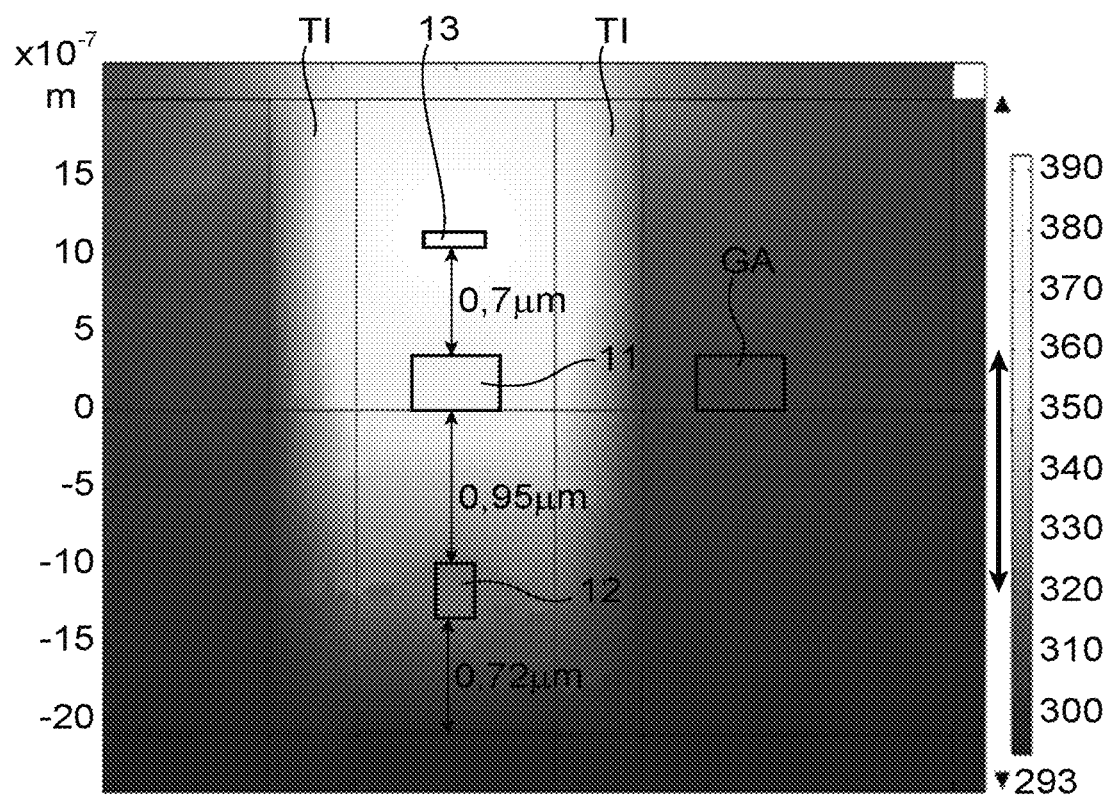
FIG. 9 is a thermal simulation result of the attenuator circuit in FIGS. 4-6.

FIG. 9 shows a thermal simulation of the circuit in FIG. 6. This simulation shows that by keeping the maximum temperature of the heater below 100° C. to avoid circuit degradation while allowing sufficient separation between the upper guide and the heater not to undergo optical losses, a temperature difference (expressed in Kelvin in the figure) between the first and second guides of 40° C. is largely achievable.

As represented in FIGS. 5 and 9, the circuit may further include thermal insulation TI trenches which extend on either side of the interferometer in a light propagation direction. The thermal insulation trenches are filled with a low thermal conductivity material, for example air. FIG. 9 shows that a 500 nm wide air TI trench separating the circuit according to the invention from an adjacent guide GA is sufficient to effectively isolate the circuit from other components. By virtue of these lateral trenches, the circuit according to the invention can thus be even more easily integrated into a dense guide network and several circuits according to the invention can operate independently as well as being arranged adjacently in such a dense network.

In the example herein represented, the trenches are deep and insulate the heater 13, first guide 11 and second guide 12 at the same time. Since the second guide 12 is further away from the neighbouring guides than the first guide 11, its insulation is less critical. It is therefore advantageous to use shallower, thereby more easily achievable trenches, which insulate the first guide 11 to a greater extent as compared to the second guide 12 in order to increase the temperature difference between both guides.

Figure 11:
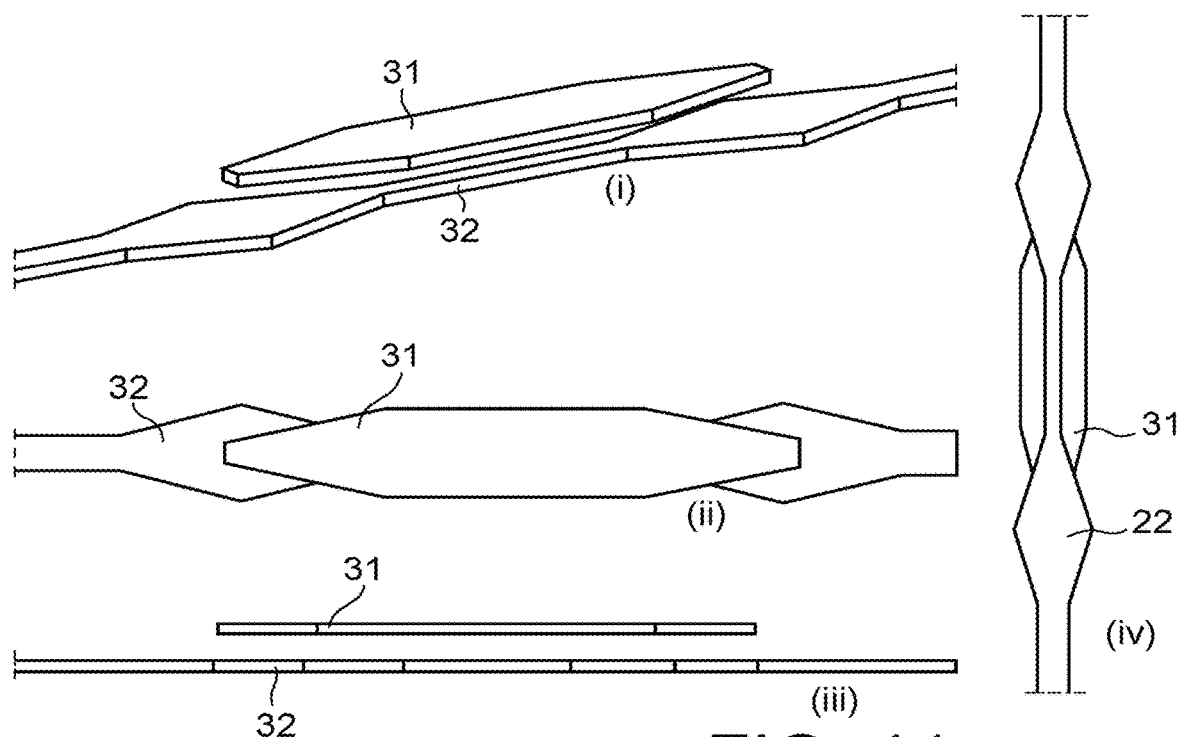
FIG. 11 represents different views of the waveguides of a circuit in accordance with the third possible embodiment of the invention.

Different views of the first and second waveguides 31, 32 of a circuit in accordance with the third possible embodiment of the invention (i.e. according to the diagram in FIG. 10) with transfer sections not employing transition guides but only modal (taper) transition portions in each of the first and second guides have been represented in FIG. 11. Thus (i) a perspective view, (ii) a top view, (iii) a side view and (iv) a bottom view are found. In this embodiment, the difference in width of the first and second guides is used not only to modify the temperature sensitivity of each guide but also to spread the effective index of each guide to avoid evanescent coupling between guides in the modulation section. A similar effect can be obtained by providing guides with different thicknesses and/or made of different materials, with or without different widths.

Figure 12:
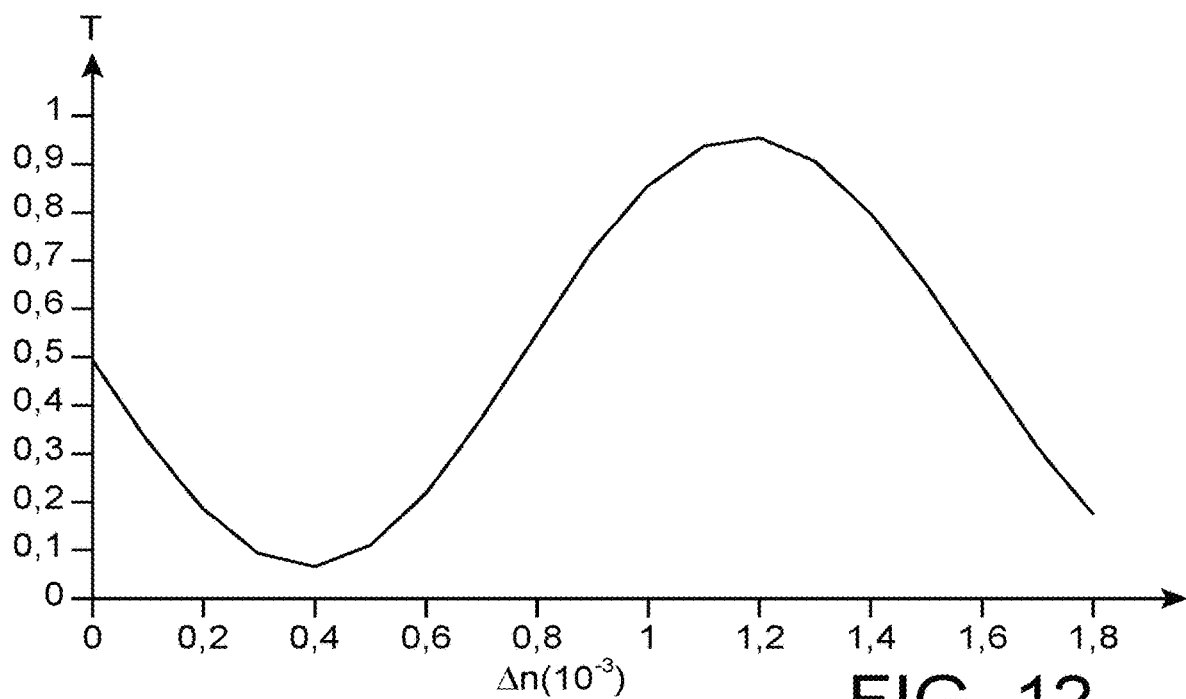
FIG. 12 represents the transmission of the attenuator circuit of FIG. 11 as a function of the index difference between the materials making up the first and second waveguides.

FIG. 12 represents the transmission rate T of the attenuator circuit in FIG. 11 as a function of the index difference Δn between the materials making up the first and second waveguides, with the length of the modulation section augmented to 1.3 mm. It is observed that an index difference of about $8 \times 10^{-4}$ is sufficient to vary the transmission by about 10% at a transmission of more than 90%.

Figure 14:
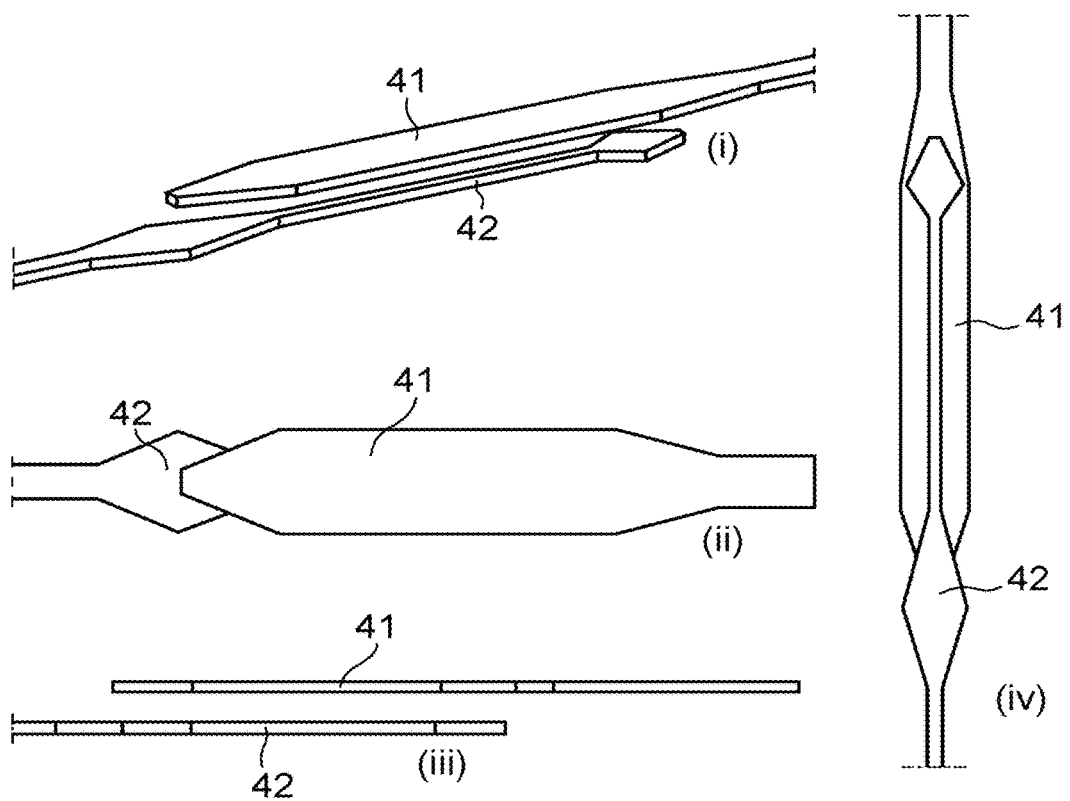
FIG. 14 represents different views of the waveguides of a circuit in accordance with the fourth possible embodiment of the invention.

Different views of the first and second waveguides 41, 42 of a circuit in accordance with the fourth possible embodiment of the invention (i.e. according to the diagram in FIG. 13 with input and output on two different levels) with transfer sections not employing transition guides but only modal (taper) transition portions in each of the first and second guides have been represented in FIG. 14. Thus (i) a perspective view, (ii) a top view, (iii) a side view and (iv) a bottom view are found. In this embodiment, the difference in width of the first and second guides is used to modify the temperature sensitivity of each guide as well as to avoid evanescent coupling between the guides in the modulation section. Here too, a similar effect can be achieved by differentiating the characteristics of the guides, i.e. different widths and/or different thicknesses and/or different materials.

Figure 15:
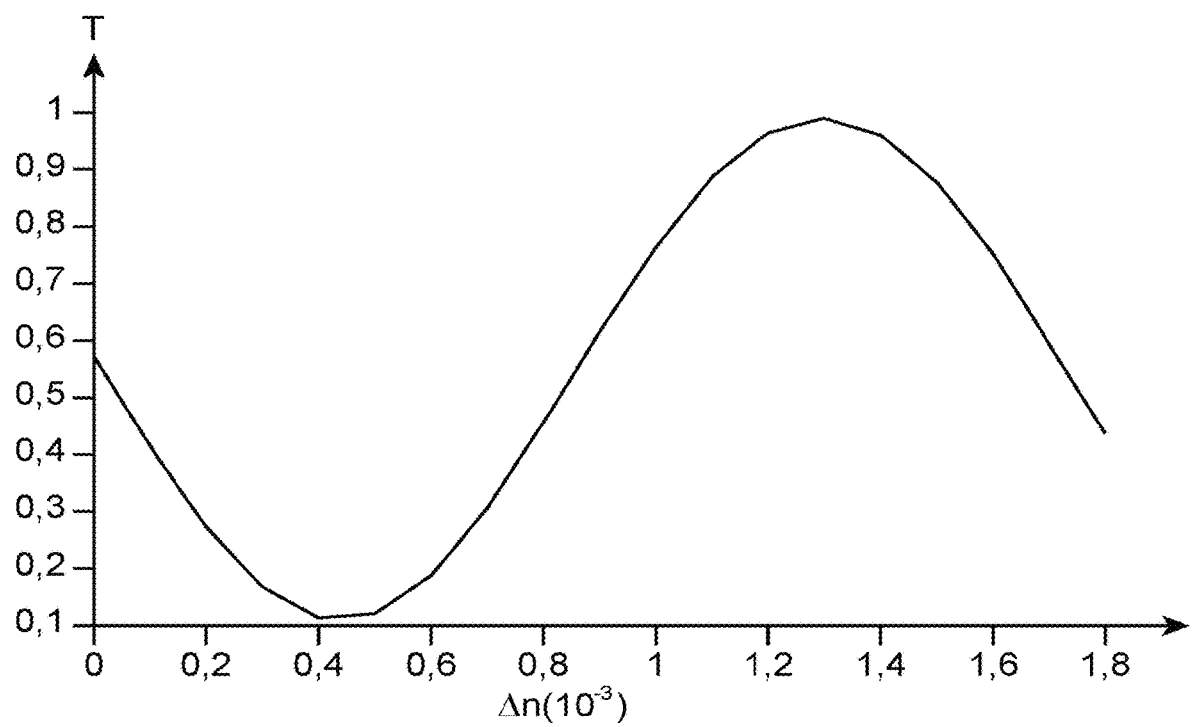
FIG. 15 represents the transmission of the attenuator circuit of FIG. 14 as a function of the index difference between the materials making up the first and second waveguides.

FIG. 15 represents the transmission rate T of the attenuator circuit in FIG. 14 as a function of the index difference Δn between the materials making up the first and second waveguides, with a modulation section length augmented to 1.3 mm. Similar performance to the circuit in FIGS. 11 and 12 is observed.

The invention claimed is:

1. A photonic circuit for variably attenuating an amplitude of an optical signal, comprising:
    a Mach-Zehnder interferometer configured to couple an input waveguide and an output waveguide, said Mach-Zehnder interferometer comprising a modulation section which includes a first waveguide, a second waveguide and a phase shifter configured to introduce a phase difference between a first optical signal propagating on the first waveguide and a second optical signal propagating on the second waveguide, wherein the first and second waveguides are arranged in two distinct parallel layers and wherein the phase shifter is a thermo-optical phase shifter arranged to act on one of the first and second waveguides.

2. The circuit according to claim 1, wherein said Mach-Zehnder interferometer further comprises:
    upstream of the modulation section, a first transfer section configured to separate, by evanescent optical coupling, an input optical signal propagating on the input waveguide between the first optical signal propagating on the first waveguide and the second optical signal propagating on the second waveguide, and
    downstream of the modulation section, a second transfer section configured to combine, by evanescent optical coupling, the first optical signal propagating on the first waveguide and the second optical signal propagating on the second waveguide into an output optical signal propagating on the output waveguide.

3. The circuit according to claim 2, wherein the first transfer section comprises a first transition waveguide arranged in a plane located between planes in which the first and second waveguides are arranged and shaped so as to recover the input optical signal and to transfer half of the input optical signal to each of the first and second waveguides.

4. The circuit according to claim 2, wherein the second transfer section comprises a second transition waveguide arranged in a plane located between planes in which the first and second waveguides are arranged and shaped so as to combine the first optical signal and the second optical signal to form the output optical signal and to transfer the output optical signal to one of the first and second waveguides.

5. The circuit according to claim 2, wherein the first and second waveguides have modal transition portions in each of the first and second transfer sections.

6. The circuit according to claim 1, wherein the thermo-optical phase shifter acts on the first waveguide of the modulation section and wherein the input waveguide is directly coupled to the first waveguide.

7. The circuit according to claim 6, wherein the output waveguide is directly coupled to the first waveguide.

8. The circuit according to claim 6, wherein the output waveguide is directly coupled to the second waveguide.

9. The circuit according to claim 1, wherein the thermo-optical phase shifter acts on the first waveguide of the modulation section and wherein the input waveguide is directly coupled to the second waveguide.

10. The circuit according to claim 9, wherein the output waveguide is directly coupled to the second waveguide.

11. The circuit according to claim 9, wherein the output waveguide is directly coupled to the first waveguide.

12. The circuit according to claim 1, wherein the thermo-optical phase shifter acts on the first waveguide of the modulation section and wherein the first waveguide has a width greater than a width of the second waveguide.

13. The circuit according to claim 1, further comprising thermal insulation trenches which extend on either side of the Mach-Zehnder interferometer in a light propagation direction.

* * * * *